United States Patent [19]

Kametani et al.

[11] Patent Number: 4,953,074
[45] Date of Patent: Aug. 28, 1990

[54] FUNCTION-DISTRIBUTED CONTROL APPARATUS

[75] Inventors: Masatsugu Kametani, Ibaraki; Kengo Sugiyama, Abiko; Takashi Kogawa, Sakura, all of Japan

[73] Assignee: Hitachi, Ltd., Tokyo, Japan

[21] Appl. No.: 215,805

[22] Filed: Jul. 6, 1988

[30] Foreign Application Priority Data

Jul. 8, 1987 [JP] Japan .................... 62-168704

[51] Int. Cl.⁵ .................... G06F 15/46; G06F 15/16
[52] U.S. Cl. .................... 364/132; 364/134;
364/200; 364/222; 364/230.4; 364/900;
364/921; 364/931.44
[58] Field of Search .................... 364/131–136,
364/200 MS, 900 MS, 140–147

[56] References Cited

U.S. PATENT DOCUMENTS

| | | | |
|---|---|---|---|
| 4,058,711 | 11/1977 | Ondercin et al. | 364/133 |
| 4,118,771 | 10/1978 | Pomella et al. | 364/134 |
| 4,497,019 | 1/1985 | Waber | 364/132 |
| 4,628,436 | 12/1986 | Okamoto et al. | 364/134 X |
| 4,803,613 | 2/1988 | Kametami et al. | 364/132 |

OTHER PUBLICATIONS

Arzawa et al., "Development of New Type Robot Control Console (Model 4)"; Tokico Review, vol. 28, No. 1, '84, pp. 20–26.

Hopkins, "An Improved Controller for the Rhino Robot Arm", Conf. Proc. IEEE Southeast Con. '85; pp. 333–337.

*Primary Examiner*—Joseph Ruggiero
*Attorney, Agent, or Firm*—Antonelli, Terry, Stout & Kraus

[57] ABSTRACT

A function-distributed control apparatus comprises a first bus, a second bus, and at least one base processor element which includes a first main processing unit connected to at least the first bus, a second main processing unit connected to at least the second bus, and a dual-port memory with a mutual interrupt circuit connected to both these main processing units for communications between them. The first bus and the first main processing unit are chiefly for intelligent processing required for controlling a machine, while the second bus and the second main processing unit are chiefly for motion control of the machine. Those buses are also connected to various intelligent subsystems each including a processing unit and a dual-port memory with a mutual interrupt circuit for communications with the base processor element.

17 Claims, 3 Drawing Sheets

FUNCTION-DISTRIBUTED CONTROL APPARATUS

CROSS-REFERENCE TO RELATED APPLICATIONS

Background material for the present invention is contained in copending applications Ser. No. 860,430, filed by Masatsugu Kametani et al. on May 7, 1986, now U.S. Pat. No. 4,803,613, issued Feb. 7, 1989, and Ser. No. 13,548 filed by Masatsugu Kametani on Feb. 11, 1987, both assigned to the same assignee as the present application. The control apparatus disclosed herein is a further improvement of the control apparatus disclosed in application Ser. No. 13,548, and can conveniently be employed as a slave module of the master-slave control system disclosed in application Ser. No. 860,430, U.S. Pat. No. 4,803,613, although it can also operate satisfactorily as a stand-alone controller.

BACKGROUND OF THE INVENTION

The present invention relates to a control apparatus for controlling automated machinery in real time, and particularly to a control apparatus of high performance adapted to provide complex control, such as controlling a robot arm.

The prior apparatus for controlling automated machinery can be represented by a robot controller as disclosed, for example, in "Development of New Type Robot Control Console (Model 4)" by K. Aizawa et al., TOKIKO REVIEW, Vol. 28, No. 1, 1984, p.p. 20–26. As shown in FIG. 3 thereof, the control console fundamentally consists of a main CPU that works as a master processor, peripheral units thereof, and a servo unit. The peripheral units include a variety of types of I/O units, and are connected to a local bus in the main CPU via interface circuits, the local bus being connected to a microprocessor. The servo unit is connected to an externally extended bus that is connected to the local bus via a bus buffer. As optional units, a high-speed arithmetic unit and a hard disc control unit may be additionally connected to the externally extended bus.

The above-mentioned conventional control apparatus lacks extensibility in the processing ability of the main CPU. To supplement the functions, an intelligent subsystem having a CPU may be connected as an I/O unit to the local bus. However, the intelligent subsystem thus connected can do nothing but to passively work as an I/O unit for the main CPU. There are provided no facilities for voluntary communications from the intelligent subsystem to the main CPU. Therefore, the main CPU must control the intelligent subsystem in a top-down manner. Accordingly, the software overhead for controlling the system tends to increase despite a high ability of autonomous operation inherent in the intelligent subsystem.

Moreover, a configuration which is provided with only a single externally extended bus imposes considerable limitations on increasing the hardware amount. The number of elements successfully connectable to a bus is limited for electrical reasons. With reference to communication means between the processor in the main CPU and various units, furthermore, both the hardware architecture and the usage thereof in software lack uniformity. These circumstances also make it difficult to add functions and make it cumbersome to maintain the system.

These disadvantages are detrimental to the realization of many features required for a high-performance control apparatus, such as the extensibility in processing ability and function, the function distribution and modularization that are helpful to inproving the maintainability of hardware, and the easiness in preparing and maintaining software which implements the individual functions.

SUMMARY OF THE INVENTION

It is an object of the present invention to provide a high-performance control apparatus for controlling automated machinery that has high extensibility in the processing ability and functions and that offers excellent maintainability of both the hardware and software.

Another object of the present invention is to provide a control apparatus in which functions are effectively distributed, enabling the above-mentioned extensibility and maintainability to be obtained.

A further object of the present invention is to provide a control apparatus which is equipped with a uniform and efficient communication mechanism, enabling the above-mentioned extensibility and maintainability to be obtained.

Still further object of the present invention is to provide a control apparatus which enhances the autonomous operation of various modules, enabling the above-mentioned extensibility and maintainability to be obtained.

The control apparatus according to the present invention includes a first bus, a second bus, and at least one base processor connected to these two buses, the base processor element including a first main CPU connected to at least the first bus, a second main CPU connected to at least the second bus, and a dual-port memory connected to these two main CPU's. The first bus and the first main CPU engage in performing the intelligent processing required for controlling a machine, and the second bus and the second main CPU engage in controlling the motion of the machine.

An intelligent subsystem having a CPU can be connected to either the first bus or the second bus via a dual-port memory with a mutual interrupt mechanism. The dual-port memory with a mutual interrupt mechanism responds to an access by either one of the two CPU's connected thereto to the corresponding dual-port memory area, and generates an interrupt signal that is to be sent to the other CPU. The dual-port memory connected between the main CPU's may also include a mutual interrupt mechanism.

The present invention includes the following features and advantages.

(a) The base processor element is connected to two independent system buses to obtain an electrically high degree of extensibility and a remarkably increased communication throughput, which helps to increase extensibility of the overall processing ability of the system and the extensibility of the functions.

(b) The base processor element is constituted by two main CPU's that are connected to each other via a dual-port memory, and a number of independent processing functions or tasks that have hitherto been executed in a single CPU in the usual manner of multi-tasking or the like are divided into a group of functions for the intelligent processing and a group of functions for the motion control, and are distributed to the two CPU's. Therefore an increase in the overhead is suppressed, and the processing ability of the base processor is doubled.

(c) Dual-port memories are used in the communication mechanism that couples the main CPU's in the base processor element and couples the base processor element to the intelligent subsystem connected to the system bus, in order to decrease the communication load on the communication system including the system bus as well as to uniformalize the communication protocal and procedure. Moreover, the distribution of functions explicitly corresponds to the hardware arrangement, making it possible to improve various characteristics of the software, such as the maintainability, funtion describing ability, function extensibility, and uniformity.

(d) The mutual interrupt mechanism combined with the dual-port memory offers a dynamic mutual task start function with little overhead, whereby each intelligent module can perform autonomous operation efficiently. Therefore, not only is the processing ability improved, but also the independency of the hardware modules and software modules is improved, making it possible to obtain high extensibility of functions and maintainability.

Other objects, features and advantages of the present invention will become obvious from the following detailed description in conjunction with the accompanying drawings.

DETAILED DESCRIPTION OF THE PREFERRED EMBODIMENTS

An embodiment of the present invention will now be described in conjunction with the drawings.

Figure 1:
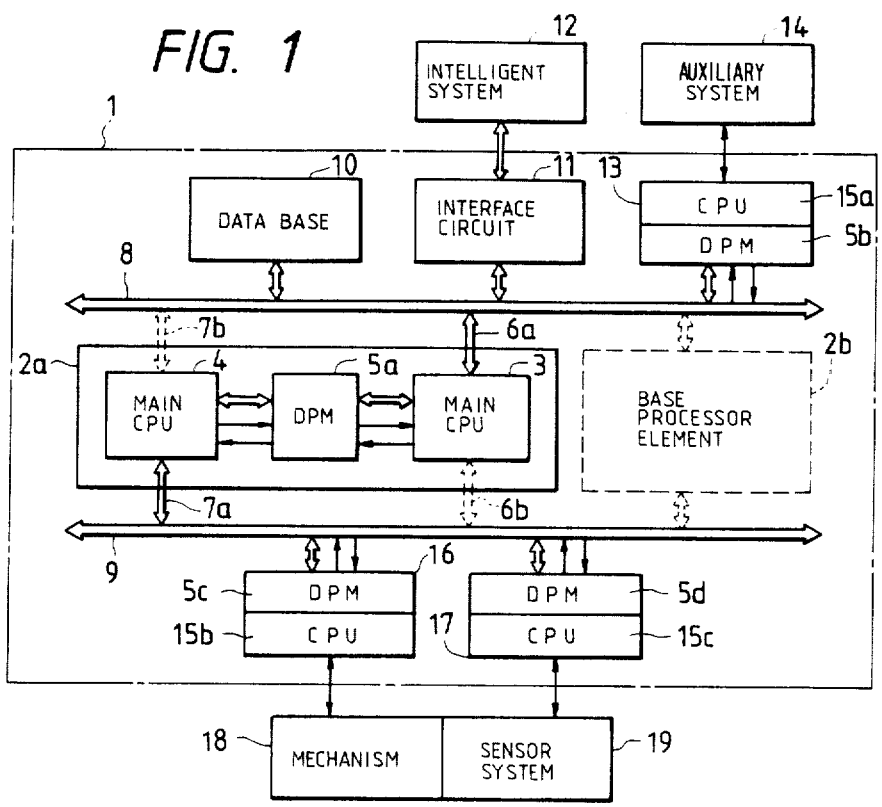
FIG. 1 is a block diagram illustrating the hardware configuration according to an embodiment of the present invention.

FIG. 1 is a block diagram illustrating the hardware configuration according to an embodiment of the present invention. A base processor system of a base controller 1 according to the present invention consists of at least one base processor element 2a, and at least two system buses 8 and 9 that are accessible from the base processor element 2a. Base processor elements 2a, 2b and so on of any number and having the same structure can be connected between the system buses 8 and 9. The base processor element 2a includes two main CPU's 3 and 4, and a dual-port memory (DPM) 5a that is randomly accessible from these CPU's. The main CPU 3 and the main CPU 4 can communicate with each other via the dual-port memory 5a.

The CPU 3 can access at least the system bus 8 over a line 6a. An access line 6b to the system bus 9 can be provided as required. Similarly, the CPU 4 can access at least the system bus 9 over a line 7a. An access line 7b to the system bus 8 can be provided as required, too.

The system bus 8 is connected chiefly to peripheral circuits and interface circuits participating in sequence control and intelligence control. To the system bus 8 are connected, for instance, a data base memory system 10 for intelligent processing, a communication interface circuit 11 that connects to a host processor or any other external intelligent system 12, and an intelligent input/output control circuit 13 having a CPU 15a that connects an auxiliary system 14, such as a common sensor system, a universal input/output system, an auxiliary data processing system for intelligent processing, or the like. In short, the system bus 8 is used for intelligent sequence control inclusive of the control of the intelligence system and the man-machine system. The system bus 8, therefore, is called an intelligent processing bus. The main processor which uses the system bus 8 is the CPU 3 (intelligent processing CPU) in the base processor element.

The system bus 9, on the other hand, is connected chiefly to peripheral circuits and interface circuits participating in motion control. To the system bus 9 are connected, for instance, an intelligent servo controller 16 having a CPU 15b that performs servo-control for a mechanism (e.g., robot) 18 that is to be controlled, and an intelligent input/output control circuit 17 having a CPU 15c that controls a local sensor system (e.g., a power sensor attached to the tip of the robot hand) 19 which supplies data affecting the parameter of motion control, or that controls a universal input/output system for data that is directly used for motion control. In short, the system bus 9 is the one which supplies data for motion control or to which are connected subsystems for directly controlling the motion of the object that is to be controlled. The system bus 9, therefore, is called a motion control bus. The main processor which uses the system bus 9 is the CPU 4 (called a motion control CPU) in the base processor element.

In addition to the main CPU's, a CPU for input/output processing may be provided as a sub-CPU in the base processor element. The sub-CPU is considered to be an intelligent I/O subsystem for the main CPU. Such a subsystem is usually connected to the system bus 8 or 9. However, the subsystem that must be incorporated for a particular application often should be designed and fabricated as a subsystem in the base processor element from the viewpoint of cost. In contrast, the subsystem of which the function and processing ability are expected to be expanded or modified had better be connected to the system bus 8 or 9 by giving priority to the extensibility and the versatility.

One of the features of the present invention is that not only the main CPU's 3 and 4, but also the CPU's in the intelligent subsystems (denoted by 13, 16 and 17 in FIG. 1) and the main CPU's are coupled together through dual-port memories, thereby to constitute a data communications network. In particular, the intelligent input/output control circuit 13 is connected to the system bus 8 through a dual-port memory 5b. The base processor element 2a is allowed to make a direct access to the dual-port memory 5b via the system bus 8, and can share the content of the dual-port memory 5b with the intelligent input/output system 13. Similarly, the intelligent servo controller 16 has a dual-port memory 5c, and the intelligent input/output control circuit 17 has a dual port memory 5d. The base processor element 2a can share the necessary data with these subsystems via the system bus 9.

Owing to the above-mentioned construction, the load on the communication system inclusive of the load on the system bus can be greatly decreased without impairing the tight coupling between the base processor element and the intelligent subsystems. For instance, when there exist many intelligent subsystems as bus masters on a system bus, the communication ability of the bus overflows and the overall system does not work efficiently. This problem, however, can be solved by the aforementioned structure. Similarly, the dual-port memory 5a for coupling the main CPU's 3 and 4 in the base processor element 2a, is provided as a hot line for exchanging and sharing necessary data between the main CPU's 3 and 4 without requiring the data to pass through the system buses 8 and 9, and serves to optimize the communication throughput between the main CPU's.

Figure 2:
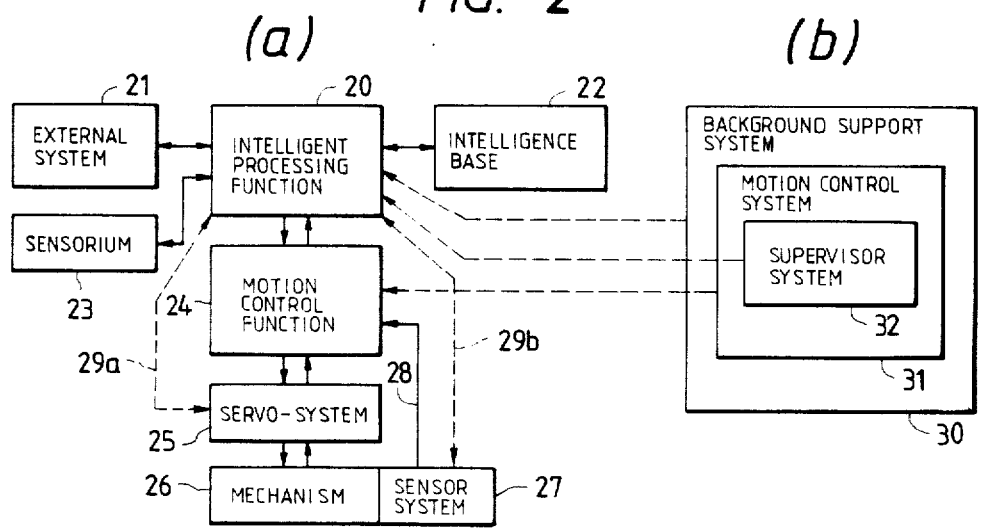
FIG. 2, including constituent parts (a) and (b), is a block diagram illustrating the functional structure of the apparatus of FIG. 1.

FIG. 2 is a functional block diagram illustrating functions that will be carried out by the hardware structure shown in FIG. 1. An intelligent robot is selected as an object to be controlled in this example. In FIG. 2(a) the intelligent processing function 20 executed by the main CPU 3 effects, as main jobs or background jobs, functions such as inferring, learning, monitoring the system condition, and supervising the whole system using data from an intelligence base 22 or a sensorium (sensor system) 23, and gives a suitable operation command such as information specifying the parameters of a robot motion, to a motion control function 24 with the aid of these functions, and obtains the data related to the operation condition from the motion control function 24 and reflects that data on the next command. The communication to the external system including a man-machine system is effected by the intelligent processing function 20. Thus, the intelligent processing function 20 can be regarded as a decision-making system which determines a general motion sequence. In a particular case, the data to be processed by the intelligent processing function can be received from hardware for the motion control function. When the bus slots become insufficient, for example, a subsystem for the intelligent processing function may be connected to the system bus 9 for the motion control function. However, the fundamental system configuration has a hierarchical structure in which the intelligent processing function and the motion control function operate independently of each other, and the latter function operates under the management of the former function. It may, of course, be required to feed the data necessary for determining the next operation command from the motion control function 24 back to the intelligent processing function 20. Therefore, the data communication between these two functions must be bidirectional. This communication is supported by the dual-port memory 5a.

On the other hand, the motion control function 24 executed by the main CPU 4 is hierarchically connected to a servo system 25 which effects servo control for a mechanism 26 and also to a sensor system 27 which directly participates in the motion control. The communication, such as issuing commands to these subsystems and obtaining necessary data from these subsystems, is directly carried out via the dual-port memory 5c or 5d. The motion control function 24 receives a macrosequence of operation in the form of a series of commands from the intelligent processing function 20, and interpolates intermediate operation points between the designated operation points for maintaining a required precision. In a minor loop for interpolation, an autonomous motion control is effected to generate an optimum interpolating locus through data communication 28 with respect to the sensor system 27 or the like. Thus, the motion control function 24 determines a detailed sequence for effecting motion control in accordance with the macrosequence determined by the intelligent processing function 20. Furthermore, where the data from a subsystem for the motion control function affects the macrosequence of operation that is determined by the intelligent processing function, there is constituted an adaptive control loop that includes the intelligent processing function 20.

In order to realize the above-mentioned hierarchical structure, there is no need of necessarily providing a line 6b for coupling the main CPU 3 in charge of the intelligent processing function to the system bus 9 for motion control and a line 7b for coupling the main CPU 4 in charge of the motion control function to the system bus 8 for intelligent processing, in the hardware configuration that is shown in FIG. 1. When the main CPU 3 has a supervisor function, however, it would be advantageous if the main CPU 3 were capable of making access directly to a subsystem for the motion control function as indicated by dotted lines 29a and 29b in FIG. 2(a). For this purpose, the main CPU 3 is allowed to establish communications directly to all subsystems by adding the line 6b. In a particular case, the supervisor function may be bestowed on the main CPU 4. In this case, the line 7b is added so that the main CPU 4 is allowed to establish communications directly to all subsystems.

FIG. 2(b) illustrates a kernel structure of a software system that includes the aforementioned supervisor function. A motion control software system 31 which effects the motion control is sandwiched between a background support system 30 and a supervisor system 32 in the intelligent processing software system. As described above, the hardware structure is so designed as to efficiently execute the software which has this kernel structure. Therefore, an intelligent automatic machine such as an intelligent robot can be controlled in a more human-like manner.

Figure 3:
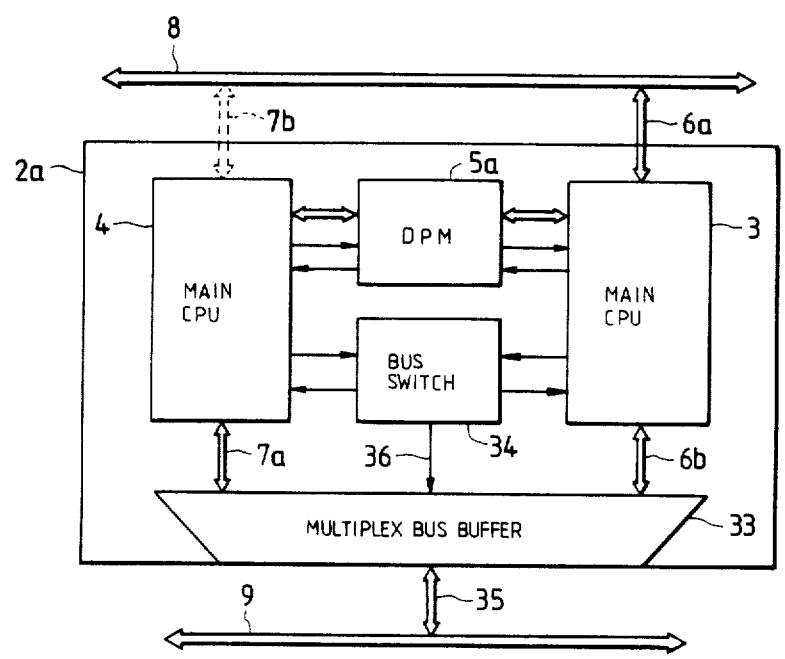
FIG. 3 is a block diagram illustrating another embodiment of a base processor element.

FIG. 3 illustrates another embodiment of the base processor element 2a for more completely implementing the above-mentioned concept. When a supervisor system is loaded on the main CPU 3, it can be considered that it is necessary for the main CPU 3 to make access directly to the subsystem for motion control only under the supervisor condition. Therefore, a bus switch 34 is provided to control the access right to the motion control system bus 9, the access right being usually given to the main CPU 4. When the main CPU 3 is under the supervisor condition and it is required to make access directly to the motion control subsystem on the system bus 9, the main CPU 3 sends a bus access request to the bus switch 34. The bus switch 34 sends a signal 36 to a multiplex bus buffer 33, and connects the line 6b from the main CPU 3 to the bus access line 35 instead of connecting thereto the line 7a from the main CPU 4. In this case, the access line 7b need not necessarily be connected from the main CPU 4 to the intelligent processing system bus 8.

The main CPU under the supervisor condition may encounter a situation in which it must place other intelligent systems under its control. In the base processor element 2a shown in FIG. 3, the bus switch 34 may be provided, with a function for locking the main CPU 4 (e.g., forcing the CPU 4 into a waiting condition or a waiting loop) with respect to the hardware or the software thereof in response to a bus access request from the main CPU 3. Thus, the hardware structure can be so constituted that the motion control function is placed under the control of the supervisor. As described above, the structure of the base processor element shown in FIG. 3 is an ideal one in the light of the functional structure and the kernel structure that are shown in FIG. 2.

Another feature of the present invention resides in the fact that each of the dual-port memories 5a–5d for data communication includes a mechanism for requesting hardware interrupts in both directions, as means for autonomously operating the intelligent systems.

Figure 4:
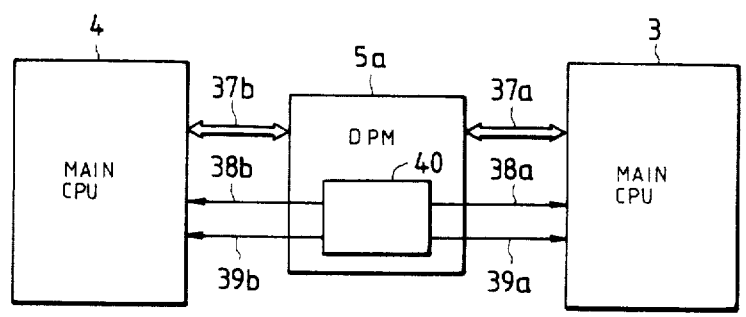
FIG. 4 is a block diagram of a dual-port memory with a mutual interrupt mechanism.

FIG. 4 illustrates a mutual interrupt mechanism with reference to the dual-port memory 5a connected between the main CPU 3 and the main CPU 4 in the base processor element 2a. In addition to access lines 37a from the main CPU 3 to the dual-port memory 5a and access lines 37b from the main CPU 4, there are further provided a mutual interrupt circuit 40, an interrupt line 38a from the main CPU 4 to the main CPU 3, an interrupt line 38b from the main CPU 3 to the main CPU 4, an end status line 39a for informing the main CPU 3 whether the main CPU 4 has accepted the interrupt or not, and an end status line 39b for informing the main CPU 4 whether the main CPU 3 has accepted the interrupt. Particular addresses on the dual-port memory 5a are used as an interrupt switch register, with which the main CPU 3 requests interrupt of the main CPU 4, and an interrupt switch register, with which the main CPU 4 requests interrupt of the main CPU 3, respectively.

As interrupt data (e.g., the starting address of an interrupt service routine to be executed by the interrupted CPU) is written onto any one of these registers, the interrupt line 38 to the CPU that is to be interrupted becomes active, and this CPU is interrupted to start a necessary task. The interrupted CPU makes access to the corresponding interrupt switch register during the interrupt handling routine, and utilizes the interrupt data stored therein in some manner (or the data may often be simply accessed but may not be really utilized). As the interrupted CPU thus makes access to this particular interrupt switch register, the interrupt line 38 to this CPU is automatically reset and becomes non-active. At the same time, the end status line 39 to the interrupt-requesting CPU becomes active to indicate that the CPU to which the interrupt request was issued has now accepted the interrupt. The end status line 39 is reset and returns to the non-active side when the interrupt switch register is accessed to request a second interrupt.

An address different from the address of the interrupt switch register may be used as a register for energizing the end status line. Furthermore, other different addresses may be used as registers for resetting the interrupt line and for resetting the end status line. In such a modification, the interrupt line is reset and the end status line is energized and reset by executing respective instructions which make access to the corresponding addresses.

The same mutual interrupt mechanism is also included in the dual-port memories 5b, 5c and 5d that establish communications between the intelligent subsystems and the main CPU's.

According to the present invention as described above, the mutual interrupt mechanism is inseparably combined with the dual-port memory such that both the interrupt request and the end status are generated and reset automatically by the hardware in the course of a minimum procedure necessary for the interrupt operation, and the software overhead is minimized. A similar interrupt mechanism, however, can be implemented in combination with I/O ports. For instance, different I/O port addresses are assigned to the interrupt switch register and the other registers, and the interrupt line and the end status line are energized and reset by executing instructions that make access thereto. The interrupt data may be directly transmitted through a particular I/O port or may be indirectly transmitted via a particular address in the dual-port memory.

When different addresses are used as those registers, or when I/O ports are utilized, the signals on the interrupt line and on the end status line must be switched by the software. For applications of some types, the switching of these signals is best controlled by the software. The degree of automation of switching these signals varies depending upon how the protocol and procedure of task start are determined. It is, however, considered most advantageous in reducing the software overhead to prepare hardware which automatically performs the signal switching, to provide a status register and a semaphore register on the dual port memory 5 as required, and to control the protocol and the procedure consistently.

Figure 5:
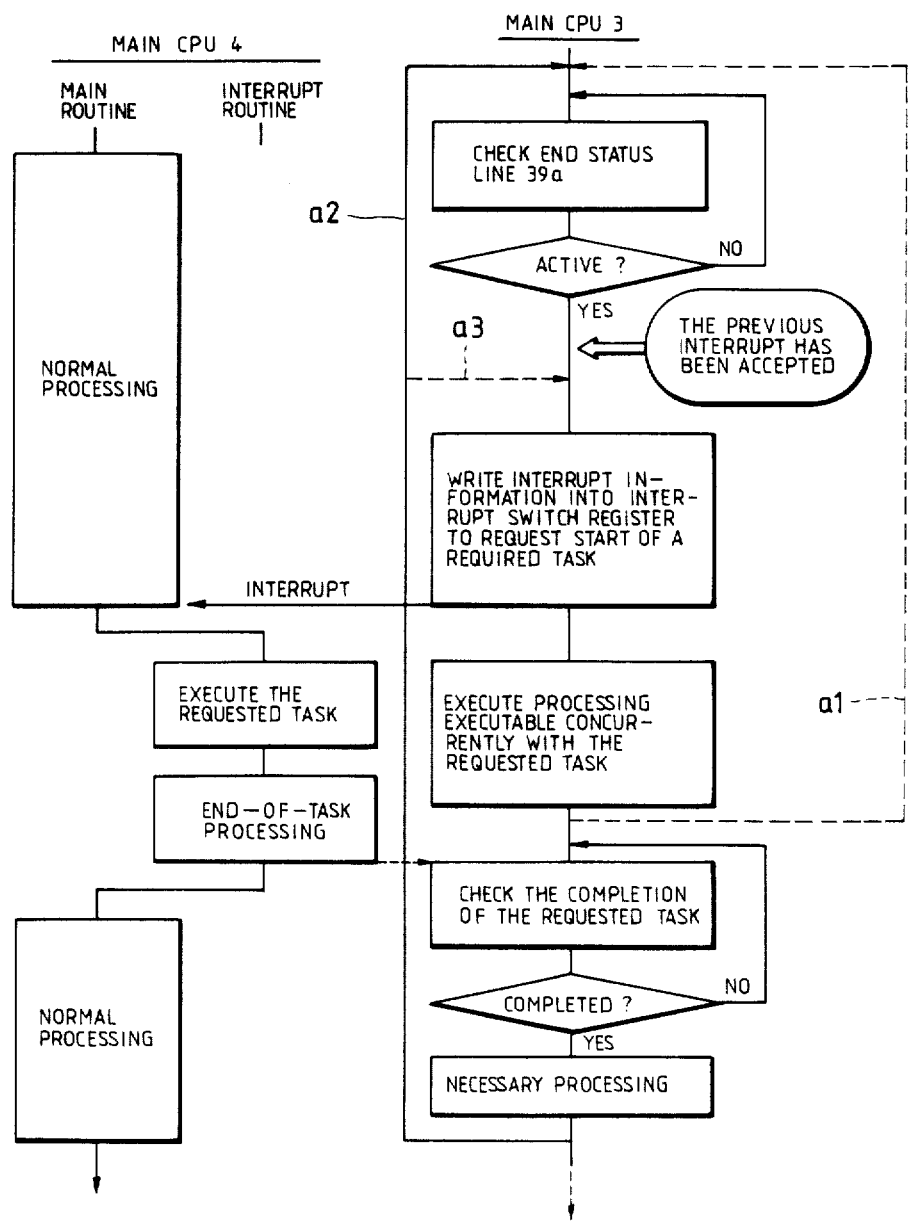
FIG. 5 is a flow chart which illustrates a task start sequence that is carried out using the dual-port memory with a mutual interrupt mechanism in the embodiment of FIG. 1.

FIG. 5 illustrates a sequence of task start processing and task processing operation performed by the main CPU 3 and the main CPU 4 using the dual-port memory 5a with a mutual interrupt mechanism. In this example, the main CPU 3 requests an interrupt of the main CPU 4 to start a required task. When it happens that the main CPU 3 must request an interrupt of the main CPU 4, the main CPU 3 tests whether the end status line 39a is active or not. When it is active, the interrupt requested previously has been accepted already by the main CPU 4 and it is learned that a next interrupt can be requested. When the end status line 39a is not active, the main CPU 3 judges that the previously requested interrupt has not been accepted yet and that it is not allowed to request the next interrupt, and waits for the end status line 39a to become active. When it is confirmed that the end status line 39a is active, the interrupt data is written into the interrupt switch register. As a result, the interrupt line 38b becomes active automatically to indicate an interrupt request to the main CPU 4, and the start of task is requested. At the same time, the end status line 39a is reset. Up to this moment, the data necessary for processing the started task must have been written already in the dual-port memory 5a.

Thereafter, the main CPU 3 executes the processing that can be executed concurrently with the task executed by the main CPU 4. When it is required to start a subsequent task, the procedure returns to checking the end status line 39a as indicated by an arrow a1. When it is required to obtain a result of task processing entrusted to the main CPU 4, the main CPU 3 examines whether the task processing is completed or not. The task end status is written by the main CPU 4 into the dual-port memory 5a when the task is completed. After having confirmed the completion of task processing, the main CPU 3 performs the necessary processing by using the result of task processing. Then, it may be required again to have the main CPU 4 start a task. If the above-mentioned confirmation of the completion of task processing also means the confirmation of the acceptance of the interrupt that was previously requested, then the next interrupt can be readily requested according to arrow a3. If it is not, checking of the end status line 39a is started according to arrow a2.

In response to the request of interrupt from the main CPU 3, the main CPU 4 is shifted from ordinary processing to the interrupt processing, whereby the data required for the task processing inclusive of interrupt data in the interrupt switch register is from the dual-port memory 5a, and the requested task processing is executed. When the interrupt processing is to be started according to this embodiment, the operation for reading the interrupt data from the interrupt switch register causes the interrupt line 38b to be reset to the nonactive condition and the end status line 39a to be set to the active condition. In a system where different addresses are used as the interrupt switch register and the other registers, however, the corresponding instructions must be executed to reset the interrupt line and to set and reset the end status line.

Starting of a task by interrupt is also executed through a similar process from the main CPU 4 to the main CPU 3, and between various intelligent subsystems and any one of the main CPU's.

The aforementioned communications and the starting of a task through the dual-port memory with a mutual interrupt mechanism constitute a common hardware communication protocol among the CPU's coupled through the dual-port memory, and remarkably promote autonomous operation of the main CPU's and intelligent subsystems, and reduce the load on the communication mechanism inclusive of system buses.

What is claimed is:

1. A control apparatus for controlling a machine, comprising:
    a first bus;
    a second bus;
    at least one processor element including a first processing unit connected to at least said first bus, a second processing unit connected to at least said second bus, and first communication means connected to said first processing unit and said second processing unit and including first memory means accessible to both said processing units, said first processing unit deciding a general sequence of motion control of said machine, and said second processing unit obtaining information of said general sequence from said first processing unit and deciding a detailed sequence for effecting said general sequence; and
    a motion control subsystem including a third processing unit and obtaining information of constituent steps of said detailed sequence from said second processing unit and executing said steps on said machine, said third processing unit being connected to said second bus via second communication means;
    said second communication means including interrupt signal generating means responsive to a request from said third processing unit for transmitting an interrupt signal to said processor element;
    said first bus being connectable to a communication subsystem for communicating with an external system which cooperates with said first processing unit in deciding said general sequence.

2. A control apparatus according to claim 1, wherein said first memory means includes means responsive to an access by either one of said first and second processing units to a corresponding area of said first memory means for transmitting an interrupt signal to the other one of said first and second processing units.

3. A control apparatus according to claim 2, wherein each of said first and second memory means further includes means responsive to an access by the processing unit which received said interrupt signal to a corresponding area of said memory means for transmitting an acknowledge signal to the processing unit which requested the interrupt.

4. A control apparatus according to claim 3, wherein said means for transmitting an acknowledge signal operates in response to an access to the same area that was accessed by the processing unit which requested the interrupt.

5. A control apparatus according to claim 1, wherein said processor element further includes an additional processing unit for input/output processing.

6. A control apparatus according to claim 1, wherein said first processing unit further supervises said apparatus and is connected to both of said first and second buses.

7. A control apparatus according to claim 6, wherein said processor element further includes means for selectively connecting said first processing unit or said second processing unit to said second bus.

8. A control apparatus according to claim 1, wherein said apparatus includes an input/output subsystem including a fourth processing unit for communicating data that is directly related to the processing by said second processing unit, said fourth processing unit is connected to said second bus via second memory means, and said second memory means includes means responsive to an access by either one of said fourth processing unit and said processor element to a corresponding area of said second memory means for transmitting an interrupt signal to the other one of said fourth processing unit and said processor element.

9. A control apparatus according to claim 8, wherein said motion control subsystem is a servo controller.

10. A control apparatus according to claim 9, wherein said input/output subsystem is connected to a first sensor system mounted on said machine.

11. A control apparatus according to claim 2, wherein said communications subsystem includes a fourth processing unit that is connected to said first bus via second memory means, and said second memory means includes means responsive to an access by either one of said fourth processing unit and said processor element to a corresponding area of said second memory means for transmitting an interrupt signal to the other one of said fourth processing unit and said processor element.

12. A control apparatus according to claim 11, wherein said communications subsystem is connected to a second sensor system mounted on said machine.

13. A control apparatus according to claim 11, wherein said communications subsystem is connected to an auxiliary data processing system.

14. A control apparatus according to claim 1, wherein said apparatus further includes a data base subsystem connected to said first bus.

15. A control apparatus according to claim 1, wherein said external system is a host processor.

16. A control apparatus according to claim 1, wherein said interrupt signal generating means in said second communications means includes second memory means accessible to both said third processing unit and said processor element.

17. A control apparatus according to claim 16, wherein said second memory means includes means responsive to an access by either one of said third processing unit and said processor element to a corresponding area of said second memory means for transmitting an interrupt signal to the other one of said third processing unit and said processor element.

* * * * *